O. H. TALBOTT.
WATER GATE.
APPLICATION FILED SEPT. 23, 1921.

1,438,873.

Patented Dec. 12, 1922.

WITNESSES

ORREN H. TALBOTT
INVENTOR.

BY

ATTORNEY.

Patented Dec. 12, 1922.

1,438,873

UNITED STATES PATENT OFFICE.

ORREN H. TALBOTT, OF NEW PLYMOUTH, IDAHO.

WATER GATE.

Application filed September 23, 1921. Serial No. 502,830.

*To all whom it may concern:*

Be it known that I, ORREN H. TALBOTT, a citizen of the United States, residing at New Plymouth, in the county of Payette and State of Idaho, have invented certain new and useful Improvements in Water Gates, of which the following is a specification.

This invention relates to water gates and embodies a form of invention analogous to my companion application filed under even date.

The objects of this invention are to provide a gate adapted for use in laterals or tributaries of irrigating ditches to permit the influx of water into the laterals to be completely cut off or the volume of water passing into the laterals adjusted; to provide a gate of this character which may be anchored in a lateral, without the necessity of using stays or supports of any kind; and to provide simply constructed gates to permit mounting of the same in a facile and expeditious manner, at the same time reducing the cost of manufacturing to a minimum and making use thereof practical notwithstanding the large numbers in which they will be used.

The above and other objects of this invention will be in part described and in part understood from the following description of the present preferred embodiment of the invention taken in connection with the accompanying drawings wherein:—

Figure 1:
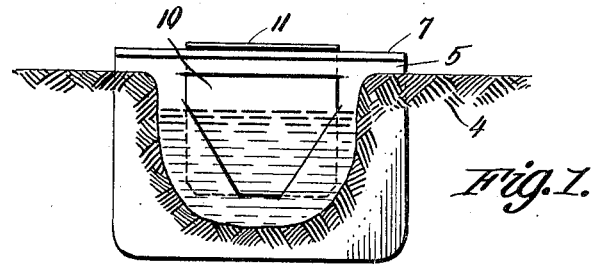
Fig. 1 is a rear elevational view of a gate constructed in accordance with my invention illustrating its application.
Figure 2:
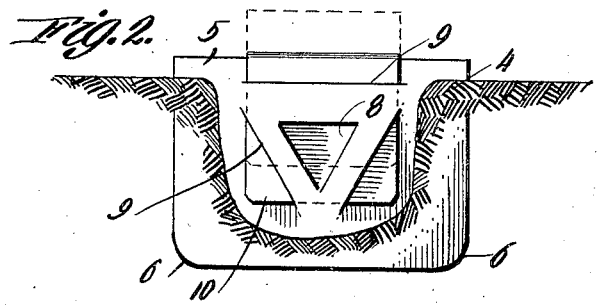
Fig. 2 is a front elevational view of the same, dotted lines being used to show an adjusted position of the slide
Figure 3:
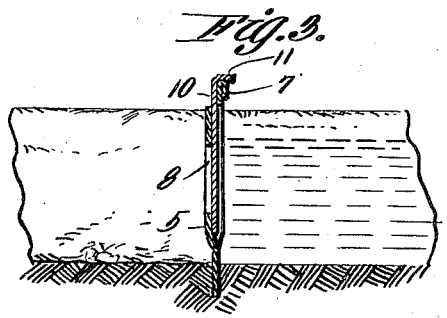
Fig. 3 is a vertical sectional view of the gate illustrating its application.

It is well known to provide irrigating ditches, which have laterals or tributaries leading therefrom, for independently irrigating rows of vegetation. It is desirable to control the volume of water passing from the main ditch into the laterals since it may be desired to permit a greater influx of water into one lateral than another and it is also desirable at times to completely cut off the passage of water from the main ditch into the laterals. Consequently, it is the intention of the present invention to produce a very simple type of gate which may be manually anchored without the use of mechanical means, completely eliminating extraneous means, such as stays or supports for maintaining the equilibrium of the gate against the pressure of the stream. In order to illustrate the application of the invention, therefore, a portion of an irrigating lateral 4 is shown which is illustrated in Figures 1 and 3 as containing water in order to demonstrate the precise use of the laterals.

The gate constructed in accordance with my invention consists of a body plate 5 which may be made of any suitable inexpensive material, preferably, however, using a non-corrosive metal. The plate is shown to be of an oblong configuration having the corners 6 at the lower margin thereof rounded to facilitate penetration of the plate in the side walls of the lateral. It is of course to be understood that the configuration of the plate may be changed to suit different conditions or to satisfy the caprice of a particular manufacturer. The upper marginal edge of the plate is reversely folded upon itself to provide a reinforcing rib or bead adapted for engagement by the hands of the operator or other means to urge the plate into the lateral as shown in the drawings.

The plate has a central V-shaped opening 8 formed therein the apex of which is preferably arranged so as to lie in proximity to the lower margin of the plate. The opening may of course be of any desired size but it will be found that the size of the opening in proportion to the size of the plates shown in the drawings will accomplish satisfactory results. A plurality of incisions 9 are formed in the plate around the opening 8, one of the incisions being parallel with the upper wall of the opening and the other two incisions parallel with the sides of the opening. These incisions are adapted to receive therethrough the lower end of a slide plate 10 which latter consists of a metal blank, the corners of the lower margin of which are preferably beveled while the upper marginal edge thereof is bent at right angles to provide a flange 11 which engages the rib 7 when the slide is in a closed position.

It is apparent that the plates 5 and 10 may be stamped from metal or other suitable material thereby reducing the cost of manufacture to a minimum. After the plates have been stamped the lower end of the slide plate 10 is slidably engageable through the incisions 9 of the main plate or body plate 5. The slide plate is frictionally engageable with the body plate, in an apparent manner, to permit the slide plate to be held in any desired position of adjustment in order that the opening 8 may be adjusted to correspondingly adjust the volume of water passing therethrough. It is especially desired that a V-shaped opening is provided and located as specified above to permit a minimum amount of water to pass through the body plate when so desired. When adjusting the plate the flange 11 may be engaged. It is to be understood that the slide plate is completely removable to permit unrestricted passage of water through the body plate when desired.

Various changes may be made in this device especially in the details of construction, proportion and arrangement of parts without departing from the spirit and scope of the invention as covered in the appended claim.

What is claimed is:—

A water gate including a body plate the lower end of which is engageable in the bed and sides of laterals to anchor the plate, said plate having an opening therein and provided with incisions around the opening, and a slide plate mounted through the incisions of the body plate to completely or partially close communication through the opening in the body plate.

In testimony whereof I affix my signature in presence of two witnesses.

ORREN H. TALBOTT.

Witnesses:
 HAZEL LOY,
 JENNIE BEERS.